(No Model.) 3 Sheets—Sheet 1.
J. O. BENDER.
TRANSPLANTER.
No. 461,519. Patented Oct. 20, 1891.
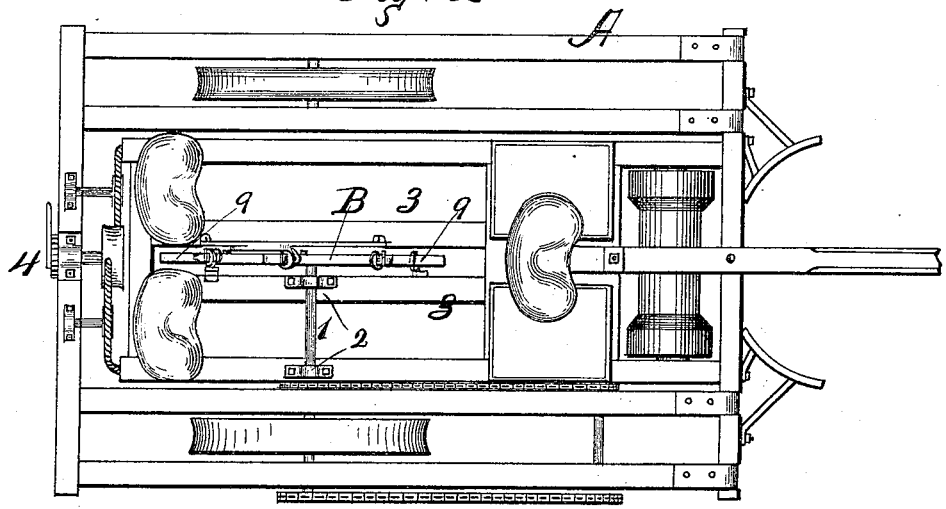
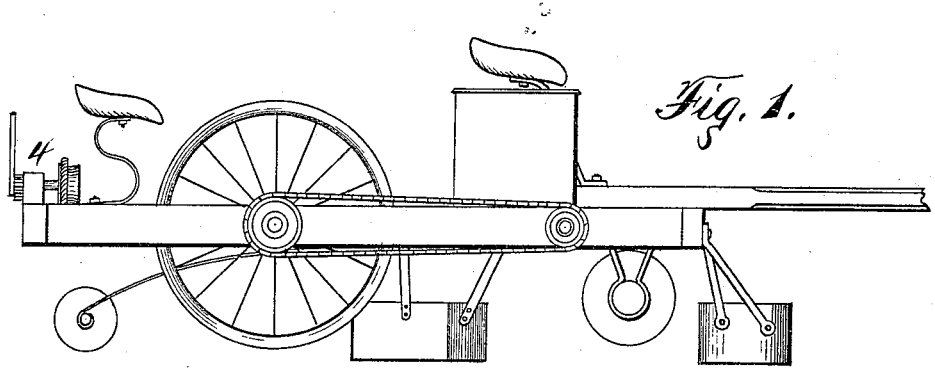
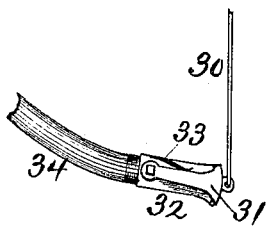
Witnesses
H. A. Carhart,
C. V. Mack
John O. Bender  Inventor
By his Attorneys
Smith & Denison (No Model.) 3 Sheets—Sheet 2.
J. O. BENDER.
TRANSPLANTER.
No. 461,519. Patented Oct. 20, 1891.
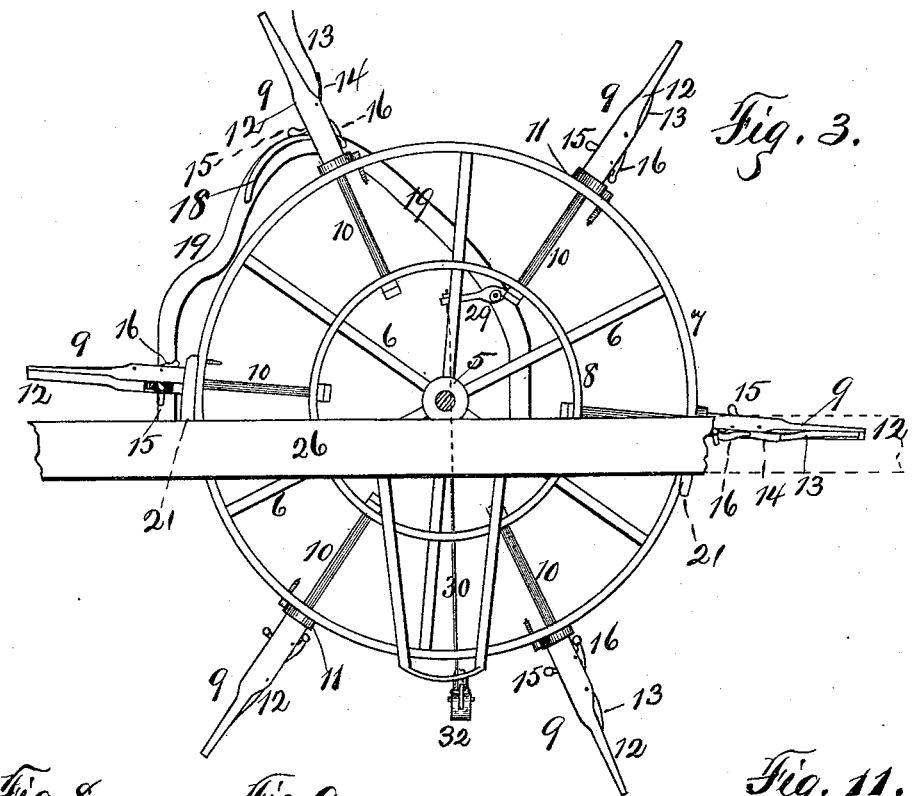
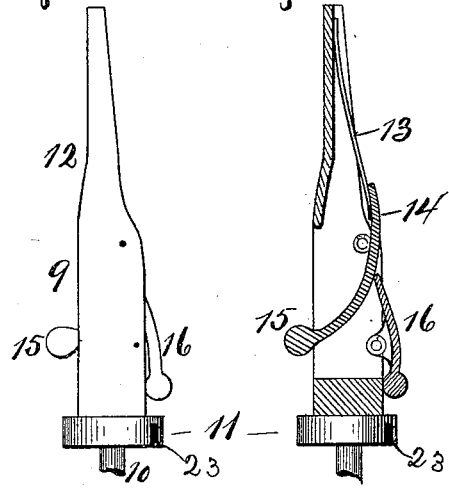
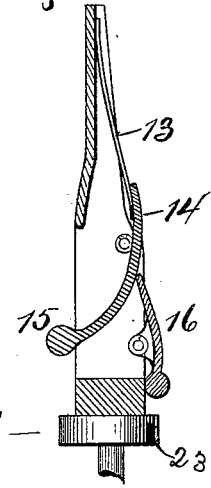
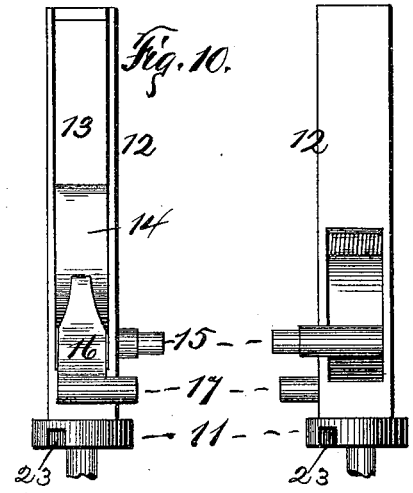
Witnesses
H. A. Carhart
E. V. Mack
Inventor
John O. Bender
By his Attorneys
Smith & Denison (No Model.) 3 Sheets—Sheet 3.
J. O. BENDER.
TRANSPLANTER.
No. 461,519. Patented Oct. 20, 1891.
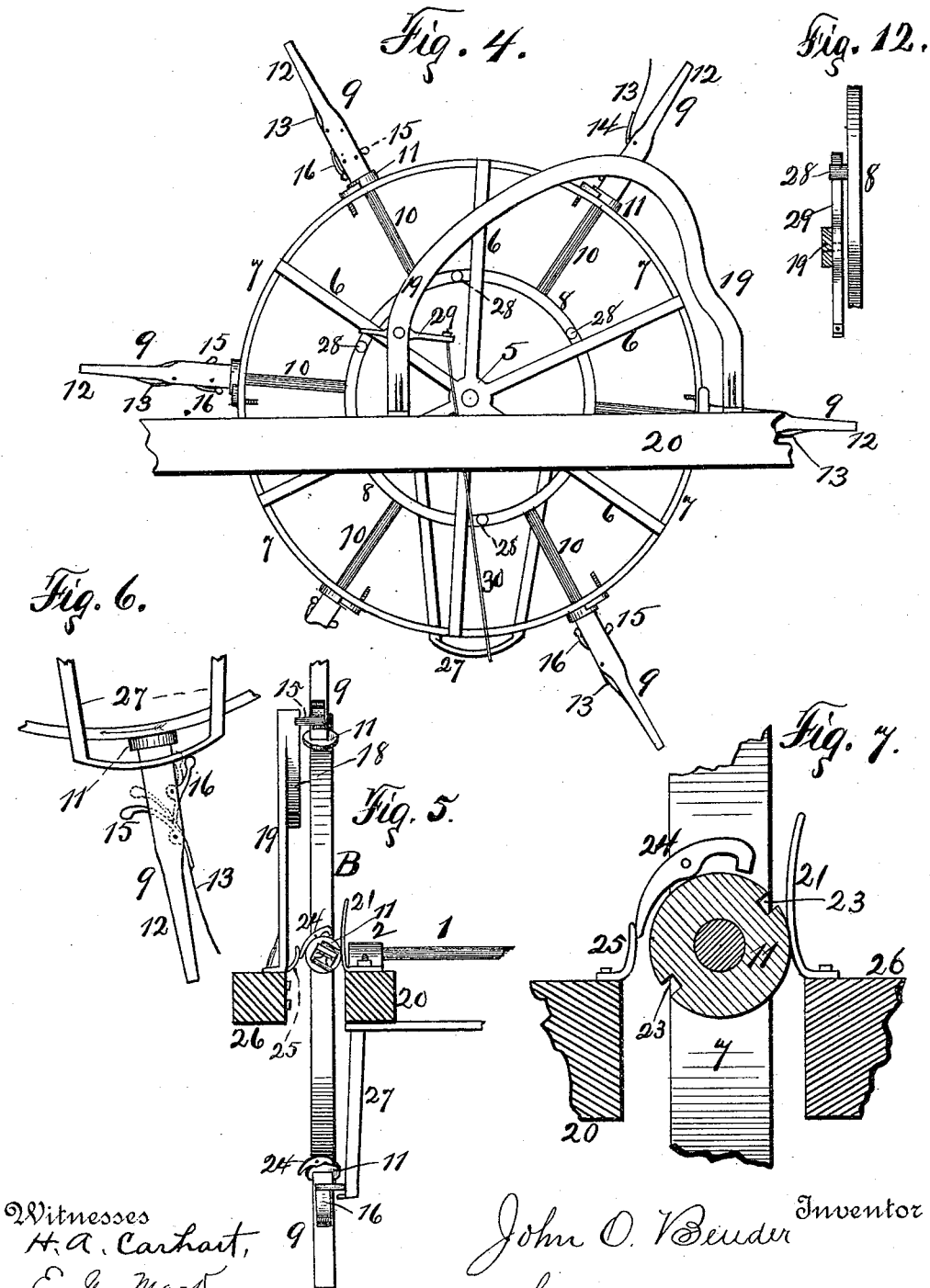

UNITED STATES PATENT OFFICE.

JOHN O. BENDER, OF FAYETTEVILLE, NEW YORK.

TRANSPLANTER.

SPECIFICATION forming part of Letters Patent No. 461,519, dated October 20, 1891.

Application filed November 3, 1890. Serial No. 370,229. (No model.)

*To all whom it may concern:*

Be it known that I, JOHN O. BENDER, of Fayetteville, in the county of Onondaga, in the State of New York, have invented new and useful Improvements in Transplanters, of which the following, taken in connection with the accompanying drawings, is a full, clear, and exact description.

My invention relates to machines for transplanting plants of all kinds in which the plants are separately placed in a rotating dropper.

My invention is to perfect the rotary dropper by providing the radial arms or spokes each with a dropper adapted to rotate so as to reverse its position to receive the plant and reverse to drop it, such reverse rotation—the opening of the dropper, its closing upon a plant, and its opening again to drop a plant—being all automatic and accomplished by mechanical means.

My invention consists in the several novel features of construction and operation hereinafter described, and which are specifically set forth in the claims hereto annexed.

It is constructed as follows, reference being had to the accompanying drawings, in which—

Figure 1 is a side elevation of the machine without the dropper. Fig. 2 is a top plan of the whole machine. Fig. 3 is an enlarged detached side elevation of the dropping mechanism. Fig. 4 is a like view of the same, looking at the opposite side thereof from that shown in Fig. 3. Fig. 5 is a rear elevation of the same. Fig. 6 is a detail of the mechanism for opening the dropper to release a plant. Fig. 7 is a detail of the mechanism for rotating each dropper. Fig. 8 is a side elevation of the dropper. Fig. 9 is a longitudinal vertical section of same. Fig. 10 is a front elevation of same. Fig. 11 is a rear elevation thereof. Fig. 12 is a detail of the faucet-tripping mechanism. Fig. 13 is a side elevation of the faucet and means for operating it.

A is the main frame, constructed with the central swing-frame hinged to the front end, with a windlass for raising and lowering the rear end, a ridging-plow in the center, a ridging-roll at the rear, water-boxes, supporting-wheels mounted upon a sectional axle, a drive-shaft, and means for transmitting power from one of the supporting-wheels to this shaft; and inasmuch as all of these parts are of the same construction as is shown and described in the Letters Patent issued to myself, dated April 29, 1890, No. 426,455, for transplanters, I do not here describe the same, except such parts thereof as may be necessary, limiting this specification to the dropping mechanism and the parts which are directly connected thereto.

The drive-shaft 1 is journaled in bearings 2 upon the central portion 3 of the main frame, and this center frame is raised or lowered by the windlass mechanism 4 at the rear end.

B is the dropper-wheel, mounted upon and rotated by the rotation of the drive-shaft, to which the power is transmitted from one of the supporting-wheels, as shown. This dropper-wheel comprises a hub 5, spokes 6, an outer rim 7, an intermediate ring 8, secured to the spokes, and the plant-holders 9, mounted and adapted to rotate in bearings in the rim and inner ring. Each plant-holder comprises a shank 10, which fits freely through said rim and ring and is held in place by any ordinary means, a circular disk base 11, resting upon said rim, and a plant-gripping box 12, projecting radially beyond the said rim. This box may be also called the "dropper." Referring to Figs. 8, 9, 10, and 11, it will be seen that this dropper consists of a box having its sides tapered, substantially as shown, open upon that face which is normally the rear one, and which is provided with a spring-lid 13, mounted upon a transverse shaft and having a body 14, curved about as shown and projecting through a slot in the bottom of the dropper-box, and having upon its free end an arm 15, which extends beyond the side of the box.

Upon an inner transverse shaft I pivot a lever 16, the point of which bears upon the rear end of the cover or lid 13, and the inner end is provided with an arm 17, which projects beyond the side of the box, so that when this arm is thrown outward the inward throw of the outer end of the lever will force the cover open. In like manner when the arm 15 is forced outward by force applied to it this will directly open the cover. A spring around the shaft upon which the cover is pivoted operates to hold it closed. The cover is of such width as to fit between the side walls of the box.

Each dropper is opened automatically twice during each revolution of the wheel by the following mechanism, first to receive and next to drop the plant, as will be hereinafter described. As the dropper comes up, the arm 15 encounters a cam-like flange 18 upon the upright frame 19, which is supported upon a bar 20 of the swing-frame, and this swings the cover open, as shown in Fig. 3, and this opens the dropper to receive the plant. Prior to this time this plant-holder has been rotated one-half way, so as to bring the cover on top, as hereinafter described. Then, as the rotation of the wheel continues and as the arm leaves the cam, the spring throws the cover shut, gripping the plant between it and the bottom of the box. This primary half-rotation, which brings the cover on top, so as to facilitate the placing of the plants in the droppers, is accomplished by means of a spring-arm 21, secured on top of the timber 22 of the swing-frame and projecting inwardly beyond its inner wall and standing in line with the rim of the dropper-wheel, so that as it rotates the base 11 of the dropper will come into frictional contact with this arm 21 and will rotate one-half of a turn, the length of the arm being graduated.

To insure the stoppage at the half-turn, I provide the dropper-base with notches 23, and pivot a gravity-pawl 24 upon the rim in such position that its point will engage with said ratchet-notches. The outer end of this pawl projects far enough to engage with the trip 25 upon the frame-timber 26, and by such engagement the pawl is disengaged from the base just before said base encounters the spring-arm, and then the base is free to be rotated, and as soon as the pawl is disengaged from the trip the point will ride upon the periphery of said base until the opposite ratchet-tooth is reached, when it will drop into engagement and stop the rotation of the dropper. After the plant has been so placed in the dropper, as the rotation of the wheel continues the pawl encounters another trip 25 and is again released, and the base encounters another spring-arm 21, projecting downward, and is thereby rotated the other half-turn, which brings the cover upon the rearward face of the box ready to be opened to drop the plant into the furrow behind the plow.

A frame 27 is suspended from the timber 22, having a curved bottom below the rim of the dropper-wheel, but contiguous to the plane thereof, and in such position that the arm 17 of the lever 16 will come into frictional contact therewith and be forced backward, (see Fig. 6,) thereby throwing the cover open, so that the plant drops out. The spring closes the cover as soon as the end of the frame 27 is passed.

To water each plant as it is dropped I use the following mechanism: Studs 28 project from the side of the ring 8 of the dropper-wheel at equal distances from each other and at a fixed distance behind each dropper. Upon the frame 19 I pivot a lever 29, so that one end will engage with each of the studs successively, and to the other end I adjustably connect the rod 30, the lower end of which is connected to the gate 31 of the faucet 32, and 33 is a spring bearing downward upon the gate and operating to close it. The hose or pipe 34 connects the faucet to the water-tank. This mechanism is timed so that a quantity of water is discharged upon each plant just after it is dropped and while the earth is rolling down the sides of the furrow onto its roots.

What I claim as my invention, and desire to secure by Letters Patent, is—

1. The combination, with the rim of the dropper-wheel, of plant-droppers mounted and adapted to rotate therein.

2. The combination, with the rim of the dropper-wheel, of a plant-dropper mounted therein, having a circular base, and a spring-arm mounted upon the frame.

3. The combination, with a wheel provided with plant-droppers and means to rotate said wheel, of plant-droppers mounted and adapted to rotate in the rim of said wheel.

4. The combination, with a rotating wheel, of plant-droppers mounted in its rim and adapted to rotate therein independent of the rotation of the wheel.

5. The combination, with a rotating wheel, of plant-droppers mounted in its rim and adapted to rotate half-way therein to receive the plant and later to rotate the other half-way before dropping the plant.

6. The combination, with a rotating wheel, of multiple plant-droppers mounted in its rim and adapted successively to rotate independently of the wheel, to open to receive a plant and later to drop it.

7. The combination, with the base of the dropper having edge notches, of a pawl engaging said notches successively and a trip to disengage said pawl at intervals.

8. The combination, with a rotating plant-dropper having a ratchet-base and mounted in the rim of a rotating dropper-wheel, of a pawl engaging with said ratchet and a trip disengaging said pawl at intervals with the rotation of said wheel.

In witness whereof I have hereunto set my hand this 14th day of October, 1890.

JOHN O. BENDER.

In presence of—
H. P. DENISON,
C. W. SMITH.